Figure 1:
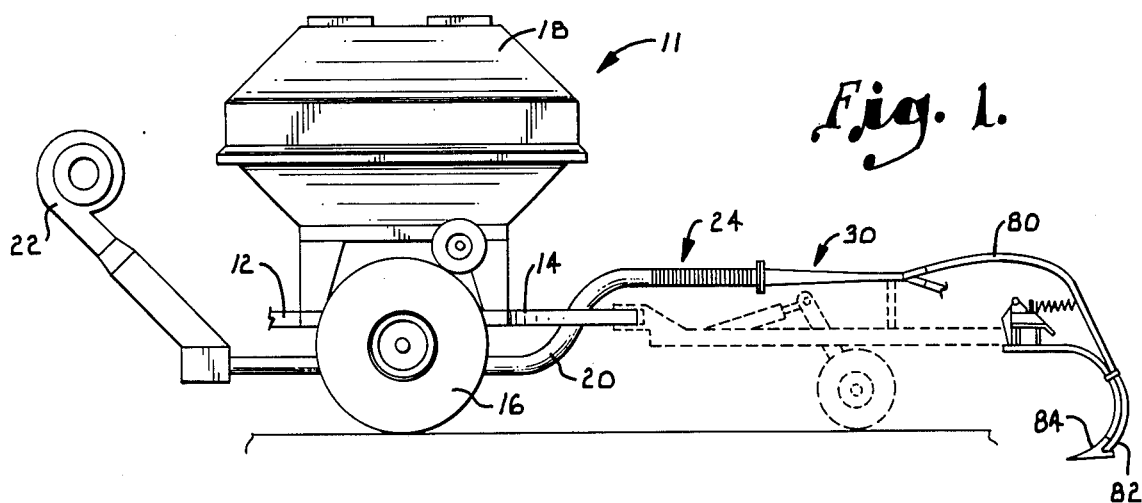
Figure 2:
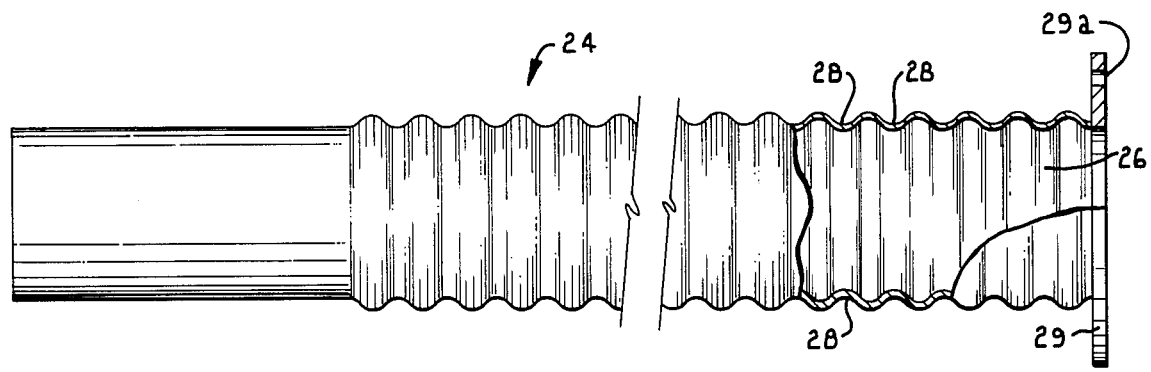
Figure 3:
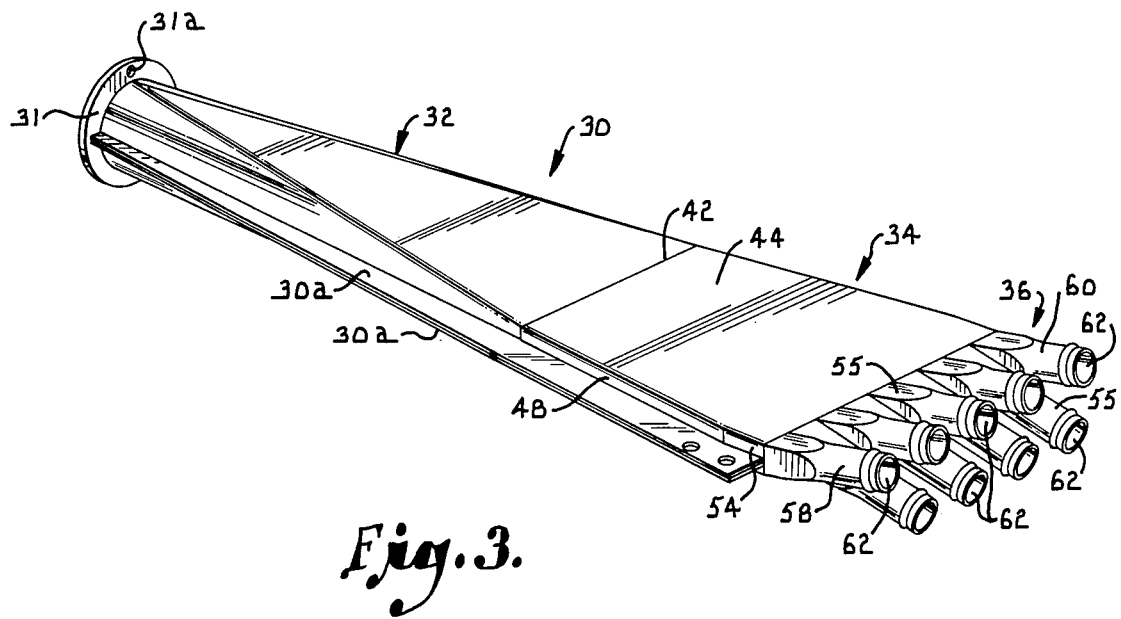
Figure 4:
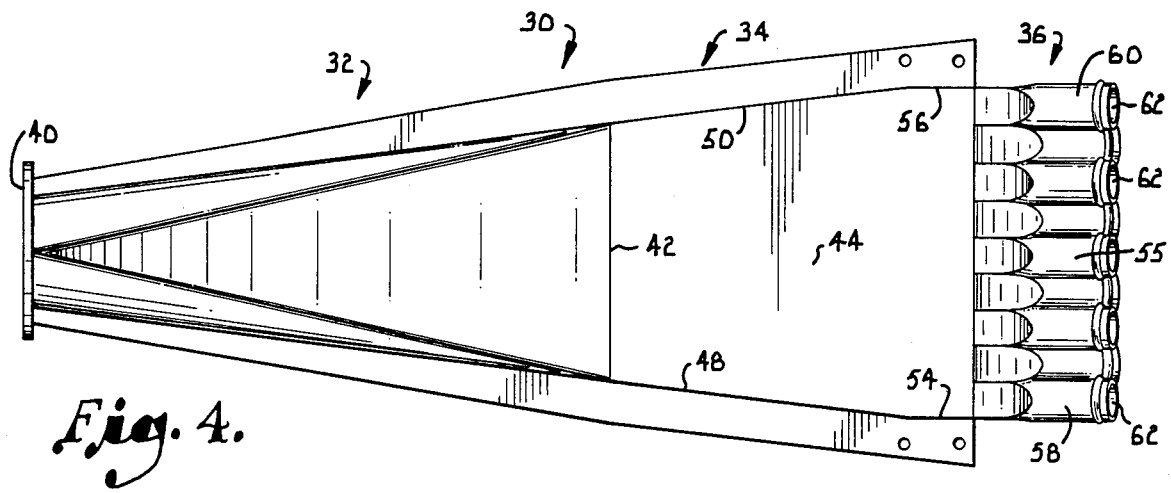
Figure 5:
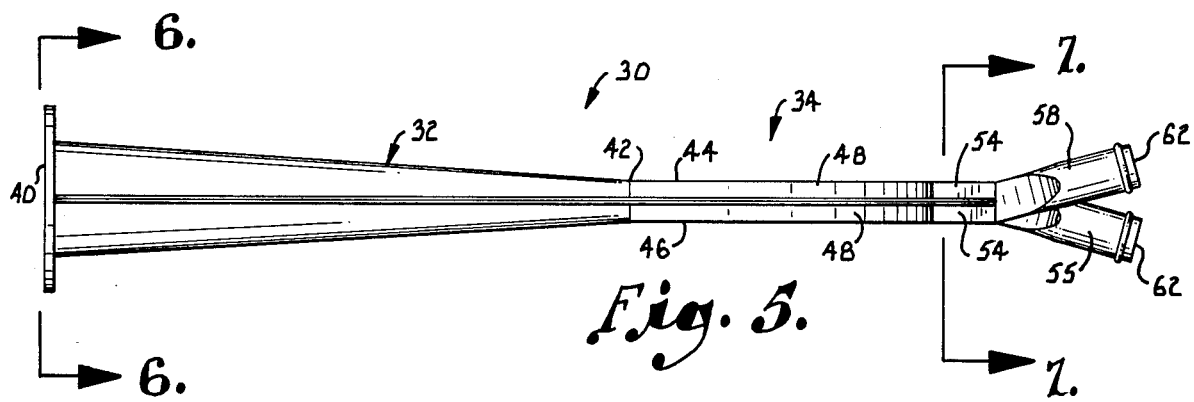
Figure 6:
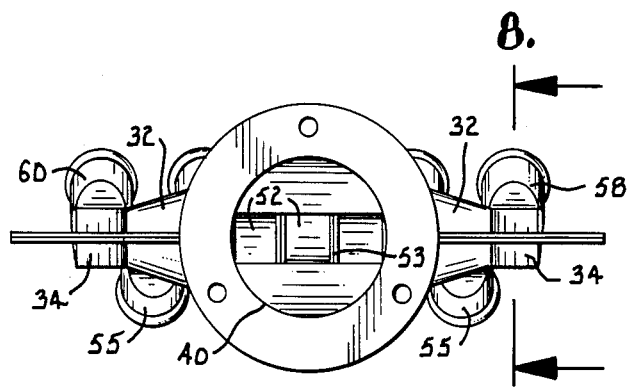
Figure 8:
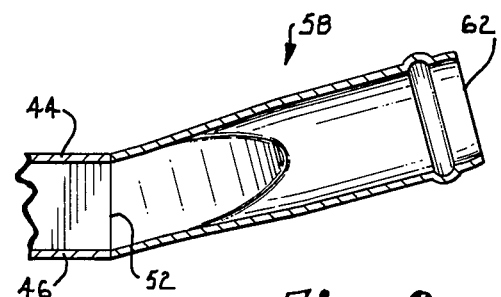

United States Patent [19]

Popowich et al.

[11] Patent Number: 4,717,289
[45] Date of Patent: Jan. 5, 1988

[54] HORIZONTALLY DISPOSED APPARATUS FOR THE RANDOM DISTRIBUTION OF SEEDS AND GRANULAR MATERIALS

[75] Inventors: Stanley Popowich; Barry B. Barsi; James W. Henry, all of Yorkton, Canada

[73] Assignee: Morris Rod Weeder Company, Ltd., Yorkton, Canada

[21] Appl. No.: 4,051

[22] Filed: Jan. 16, 1987

[51] Int. Cl.$^4$ ............................................. B65G 53/56
[52] U.S. Cl. ..................................... 406/122; 111/77; 406/181; 406/195
[58] Field of Search ................. 406/181, 155, 195, 39, 406/41, 122; 239/654, 655; 111/34, 77; 137/561 A

[56] References Cited

U.S. PATENT DOCUMENTS

| | | | |
|---|---|---|---|
| 1,792,983 | 2/1931 | Hull | 406/155 X |
| 1,850,937 | 3/1932 | Messinger | 406/181 |
| 2,171,205 | 8/1939 | Zinke | 239/655 |
| 3,631,825 | 1/1972 | Weiste | 239/655 X |
| 4,453,866 | 6/1984 | Ryan | 406/181 X |
| 4,575,284 | 3/1986 | Kelm | 111/34 X |

FOREIGN PATENT DOCUMENTS

| | | | |
|---|---|---|---|
| 1170918 | 7/1984 | Canada | 111/34 |
| 858614 | 8/1981 | U.S.S.R. | 239/654 |

Primary Examiner—Jeffrey V. Nase
Attorney, Agent, or Firm—Schmidt, Johnson, Hovey & Williams

[57] ABSTRACT

The farm implement for distributing particles such as seeds or granular fertilizers has an apparatus for splitting a single particle-entraining air stream into a plurality of individual streams containing uniform and randomly divided quantities of particles. The apparatus has a horizontally disposed corrugated pipe in downstream communication with the conduit for providing a uniform flow of particles to a horizontally disposed, tubular, stream splitting distribution body. The distribution body has a transition section that progressively and symmetrically changes in a downstream direction from a circular configuration toward a generally flat, rectangular configuration, a generally flat transfer section that leads from the transition section and spreads symmetrically laterally outwardly in a downstream direction, and a single layer of generally horizontally disposed outlet tubes at the downstream end of the transfer section. The distribution body flattens and widens the stream from a generally circular in crosssection stream entering the circular inlet to a generally shallow and wide uniformly distributed stream that flows into the entry apertures of the layer of outlet tubes wherein the stream is apportioned among the apertures into a series of substantially identical smaller streams.

8 Claims, 10 Drawing Figures

HORIZONTALLY DISPOSED APPARATUS FOR THE RANDOM DISTRIBUTION OF SEEDS AND GRANULAR MATERIALS

FIELD OF THE INVENTION

The present invention generally relates to farm implements holding a bulk supply of seeds or granular materials to be distributed to the ground and, more particularly, is concerned with a farm implement having a horizontally disposed apparatus for splitting an air-entrained stream of particles, such as seed or fertilizer, into a plurality of individual streams containing uniform and randomly divided quantities of particles for further distribution to the ground.

BACKGROUND ART

In order to optimize crop yields it is generally necessary to provide for uniform distribution of planting materials such as seeds or fertilizers. Seed distributors today commonly utilize a seed supply in communication with an air blower for providing an air-entrained stream of seeds to a distribution apparatus wherein the seed stream is divided into a plurality of smaller air-entrained seed streams. The smaller seed streams are then conveyed to the ground by corresponding tubes which discharge the seeds behind furrow openers and into furrows as the implement advances.

Specific prior practices include the use of vertical distribution apparatuses which divide an upwardly conveyed air-entrained stream of seeds into a horizontal layer of tube outlets that encircle the upper end of the apparatus. Prior horizontal distribution apparatuses have typically effected distribution across a generally flat layer of tube outlets by relying on some sort of internal bafflelike structure such as mechanical vanes or conical obstructions.

The cited prior practices have a number of problems or shortcomings. The vertical distribution apparatuses require a relatively large volume of air flow per unit of seed carried in order to overcome gravitational forces and deliver the seeds up to the tube outlets. Furthermore, the vertical distribution apparatuses, by projecting upwardly for a considerable distance above the level of the planting frame, can present serious obstructions when the planting frame includes hinging wing-type sections which fold up for transport. The internal structures of prior horizontal distribution apparatuses result in increased drag on the air stream and therefore can require additional power consumption and air flow per unit seed distributed. Furthermore, those apparatuses that have adjustable mechanical vanes can be difficult to properly adjust and as a result can provide a non-uniform distribution of seeds.

Consequently, a need exists for improvements in distribution apparatuses that will result in a uniform distribution of seeds while minimizing power and air flow requirements.

SUMMARY OF THE INVENTION

Accordingly, the present invention provides a horizontally disposed apparatus for the random distribution of seeds and granular materials designed to satisfy the aforementioned needs and overcome the aforementioned shortcomings of the prior practices. The horizontal distribution apparatus of the present invention uniformly distributes seeds while minimizing power consumption and air flow per unit seed volume distributed. A horizontal corrugated pipe uniformly and randomly distributes seeds across a circular inlet of a downstream horizontal distribution body. The distribution body has a transition section which tapers symetrically from the circular inlet to a relatively shallower and wider flat transfer section which diverges in width to a single layer of generally horizontal outlet tubes for uniform distribution of seed into those tubes. The seed stream symmetrically and uniformly flattens and widens as it passes through the distribution body thereby presenting a relatively uniform distribution of seeds across inlets of the outlet tubes. The seed stream then enters the inlets of the tubes as a series of smaller and substantially identical seed streams for further distribution to the ground.

BRIEF DESCRIPTION OF THE DRAWINGS

FIG. 1 is a schematic side elevational view of a seed or fertilizer distributing implement incorporating the principles of the present invention and showing a seed hopper, an air blower, a distribution apparatus, and a furrowing hoe;

FIG. 2 is an enlarged, horizontal fragmentary view of the corrugated supply pipe of the implement having a portion of the pipe cut away and shown in cross-section to show its interior;

FIG. 3 is an enlarged, right front perspective view of the distribution body of the implement;

FIG. 4 is an enlarged, top plan view of the distribution body;

FIG. 5 is a side elevational view of the distribution body;

FIG. 6 is an enlarged inlet end view of the distribution body taken substantially along line 6—6 of FIG. 5;

FIG. 7 is an enlarged, transverse cross-sectional view of the distribution body showing entry apertures of outlet tubes and taken substantially along line 7—7 of FIG. 5;

FIG. 8 is an enlarged, fragmentary vertical cross-sectional view of one of the outlet tubes taken substantially along line 8—8 of FIG. 6;

FIG. 9 is a top plan view of the distribution body with the top wall thereof broken away to reveal interior details of construction; and FIG. 10 is a plan view of a second embodiment of the present invention showing a distribution body having its outlet tubes arranged arcuately across the discharge end of the body.

DETAILED DESCRIPTION

Embodiment of FIGS. 1–9

A farm implement 11 as shown schematically in FIG. 1 is adapted for use with a towing tractor (not shown) and is attached to such tractor by a forwardly extending tongue 12 of a frame 14. Ground engaging wheels 16 carry the frame 14 beneath a seed, fertilizer or other particle-containing hopper 18. For convenience, it will hereinafter be assumed that particles held in the hopper 18 comprise seeds to be planted, although it is to be understood that the principles of the present invention are not correspondingly limited.

A conduit 20 extends fore-and-aft beneath the hopper 18 for receiving a metered flow of seeds therefrom. An air blower 22 is in communication with the upstream end of the conduit 20 for providing an air stream current sufficiently large enough to entrain the seeds and carry them downstream through the conduit 20. A horizontally disposed, transversely corrugated pipe 24 is in downstream communication with the conduit 20 for providing a uniform flow of seeds through an annular, internally formed discharge passage 26 of the pipe 24. The pipe 24 has a longitudinal series of internal, annular, radially inwardly projecting corrugations 28 disposed for random impingement with the seeds of the stream as they flow through the pipe 24 in order to randomly distribute the seeds throughout the cross-sectional area of the pipe 24.

A horizontally disposed, tubular, stream splitting distribution body 30 is coupled in downstream communication with the pipe 24. The body 30 has a transition section 32 progessively and symetrically changing in a downstream direction from a circular configuration toward a generally flat configuration, a generally flat transfer section 34 leading from the transition section 32 and spreading symetrically laterally outwardly in the downstream direction, and a single layer 36 of generally horizontally disposed fore-and-aft extending outlet tubes at the downstream end of the transfer section 34. One laterally outermost outlet tube 58 of the group is located adjacent the downstream end of a sidewall 48 of the body and receives a portion of the air entrained seed stream that flows along the aforementioned sidewall 48. Similarly, the other laterally outermost outlet tube 60 of the group is located adjacent the downstream end of the opposite sidewall 50 of the body and receives a portion of the seed stream that flows along sidewall 50. The remaining outlet tubes 55 are located side-by-side between the outermost outlet tubes 58,60 for receiving the remainder of the seed stream.

The transition section 32 has a circular inlet 40 for receiving seeds from the pipe 24. The pipe passage 26 and the inlet 40 are of substantially the same cross-sectional area and are axially aligned for undistrubed flow of seeds from the pipe 24 into the body 30. The transition section 32 flares laterally outwardly from the circular inlet 40 toward a rectangular downstream end 42 which is substantially wider and substantially shallower than the circular inlet 40.

The transfer section 34 is integral with the transition section 32, has a flat, horizontal top wall 4, a flat horizontal bottom wall 46, and has the opposite sidewalls 48,50 integrally interconnecting the top and bottom walls 44,46. Sidewalls 48,50 diverge laterally outwardly from the transition section 32 and have downstream terminal portions 54,56 respectively that are substantially parallel to one another. The layer 36 of outlet tubes is located at the downstream end of the transfer section 34, just beyond terminal portions 54,56.

Figure 7:
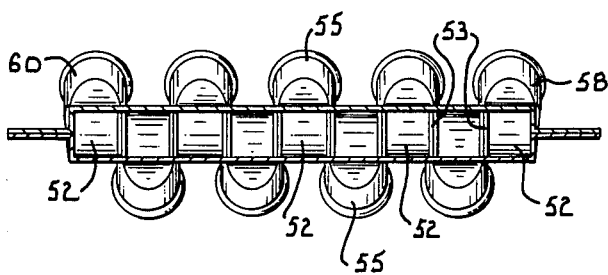
Figure 9:
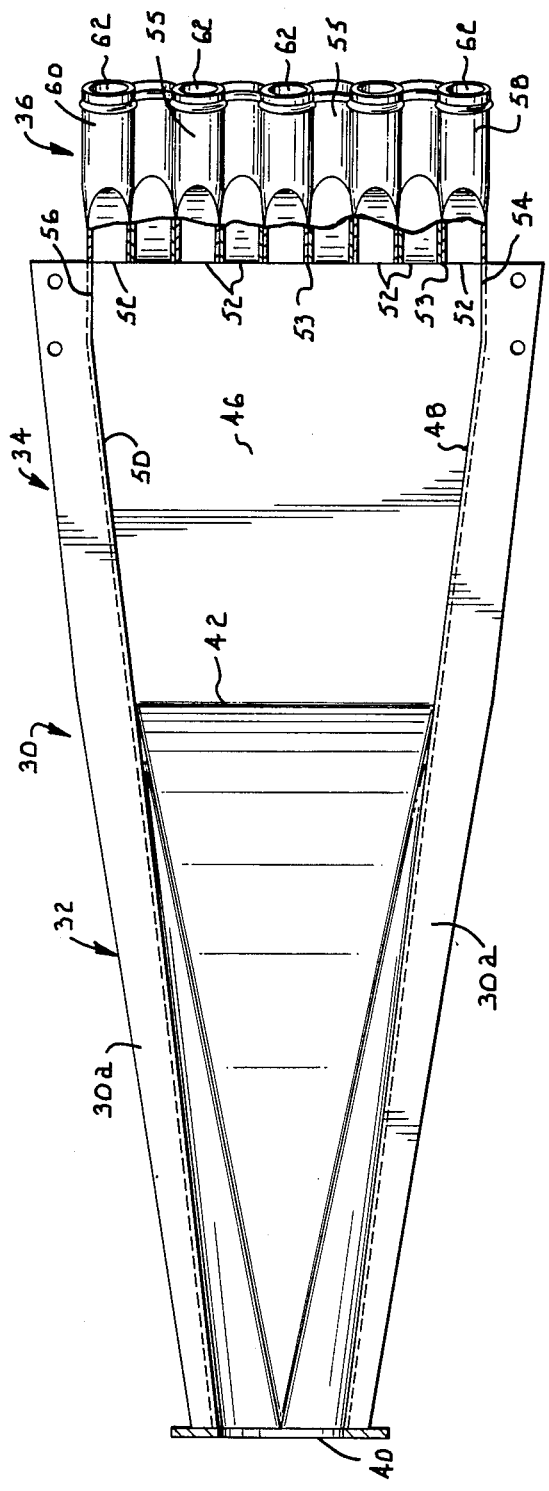

The outlet tubes 55,58,60 have rectangular entry apertures 52 of substantially identical cross-sectional areas and which due to their rectangular configuration present very little resistance, other than tube edges 53 (FIGS. 7 and 9), to the oncoming seed streams. The entry apertures 52 are of uniform height and width and are located between the downstream ends of the top and bottom walls 44,46 and lie along a straight line which is perpendicular to the longitudinal axis of the body 30. Terminal portions 54,56 serve to funnel additional seeds into the entry apertures 52 of outside outlet tubes 58,60 in order to compensate for reduced stream flow along the sidewalls 48,50 resulting from frictional drag on the seed stream by sidewalls 48,50.

The outlet tubes 55,58,60 evolve from the rectangular entry apertures 52 into corresponding generally circular outlets 62 while maintaining relatively constant interior cross-sectional areas. The circular outlets 62 of the tubes 55,58,60 are coupled with annular discharge hoses 80 (FIG. 1) which convey the seed streams to the ground. The outlet tubes 55,58,60 are alternately angled upwardly and downwardly to facilitate placement of the hoses 80 thereupon. Discharge ends 82 of the hoses 80 (FIG. 1) are positioned behind furrow openers 84 and adjacent the ground for dispensing the seed streams into newly opened ground furrows.

The body 30, like the corrugated pipe 24, may advantageously be constructed from sheet metal. In this respect, body 30 may be formed in two halves (upper and lower) and provided with lateral flanges 30a which may be welded together to produce an integral unit. The discharge end of pipe 24 and the inlet end of body 30 may be provided with circular mounting flanges 29 and 31 respectively which abut one another and receive fastening bolts or the like (not shown) through holes 29a and 31a to secure pipe 24 and body 30 together.

In use, the hopper 18 is initially filled with seeds and will deliver a metered stream of seeds to the conduit 20. The air blower 22 will force a stream of air into the conduit 20 which entrains the delivered seeds and conveys them downstream through the conduit 20 the corrugated pipe 24. The corrugations 28 of the horizontally disposed pipe 24 impinge the seeds of the stream and thereby provide a random and uniform distribution of seeds across the interior passage 26. The randomized seeds then enter the aligned circular inlet 40 of body 30, thereby providing an undisturbed uniform and randomly distributed stream of seeds into the transition section 32 of the body 30. The seeds then flow through the transition section 32 where the stream is flattened and widened symmetrically so as to provide a random and uniform distribution of seeds across the rectangular downstream end 42. The stream then enters the flat transfer section 34 which flares symmetrically outward in width so as to further widen the seed stream and thereby provide a uniform and random distribution of seeds across the layer of outlet tubes 36 located adjacent the downstream end of the transfer section 34.

The sidewalls 48,50 of the distribution body 30 produce a frictional drag on the seed stream and thus tend to reduce the flow of seeds along the sidewalls 48,50. However, the distribution body 30 compensates for this reduced seed stream flow along the sidewalls 48,50 by having terminal portions 54,56 disposed in parallel alignment with one another instead of continuing to flare outwardly so as to divert additional seeds to the outside outlet tubes 58,60.

As the seeds enocunter the nine inlet apertures 52 of outlet tubes 55,58 and 60, they become correspondingly split into nine smaller separate streams, each carrying substantially the same number of seeds. These small streams are gently transformed from substantially rectangular cross-sections to substantially circular cross-sections as the hoses 80 are approached. The seeds then exit the tubes 55,58,60 through the outlets 62 into and through the hoses 80 and then exit through the discharge ends 82 of the hoses 80 behind the furrow openers 84 and into newly created furrows in the ground.

Figure 10:
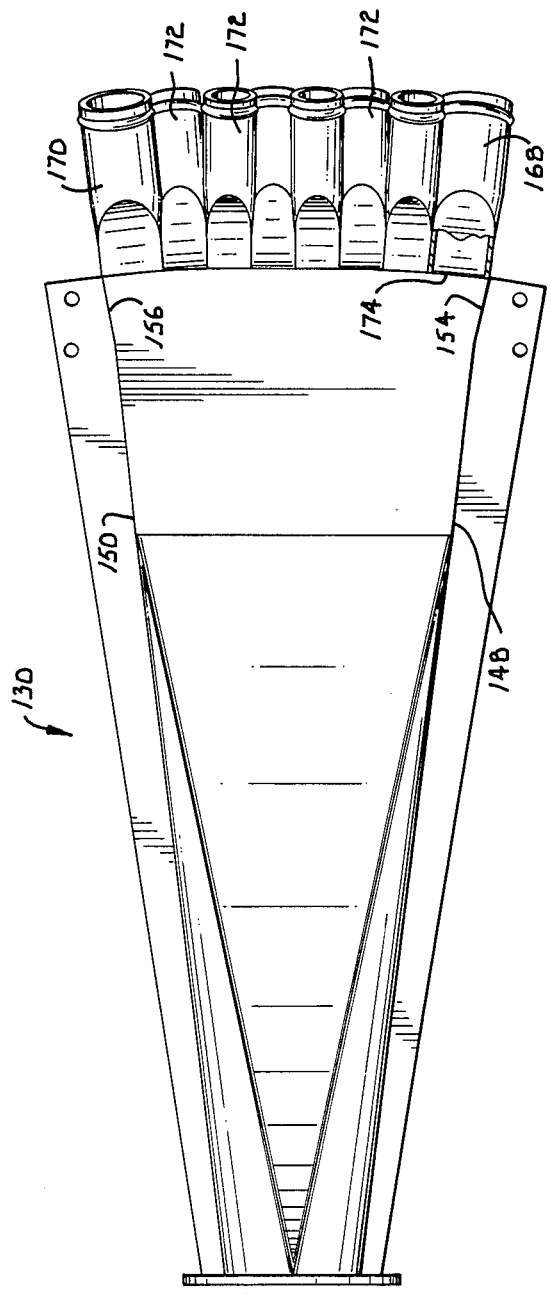

Embodiment of FIG. 10

The distribution body 130 of FIG. 10 is similar in most respects to the distribution body 30 of FIGS. 1–9 and is identical in use thereto, but compensates for the frictional drag along sidewalls 148,150 in a different manner. In this respect, the two outermost outlet tubes 168,170 are enlarged with respect to the remaining tubes 172 and, furthermore, the tubes 168-172 are arranged such that their entry apertures 174 lie on an arc having an axis of curvature upstream from the tubes on the longitudinal axis of the body. Addtionally, terminal portions 154 and 156 of sidewalls 148 and 150 respectively continue to flare outwardly at generally the same angle as the outermost outlet tubes 168,170, instead of being parallel to one another as in the first embodiment. Still further, the overall length of the body 130 is less than that of the body 30, and only eight outlet tubes are provided on the body 130 as compared to nine on the body 30. In all other respects, the body 130 is identical to the body 30 and therefore will not be described in further detail.

Positioning of the entry apertures 174 along an arcuate line permits each individual entry aperture 174 to be situated substantially normal to its portion of the fanned out oncoming seed stream so that there is minimal structure at the apertures 174 positioned in such a way as to interfere with smooth entry of seeds into the tubes. Furthermore, positioning all entry apertures 174 normal to their oncoming portion of the fanned out stream of seeds instead of just the central apertures tends to apportion the stream among the entry apertures 174 according to their cross-sectional areas and prevent the central apertures from receiving a disporportionate share of the seeds. The increased size of the outer tubes 168,170 and their apertures 174 compensates for the likelihood that there will be fewer seeds per each increment of time flowing along the sidewalls 148,150 than in the center of the body 130 due to frictional drag of the stream along sidewalls 148,150.

We claim:

1. In a farm implement having a container for holding a supply of particles to be distributed, a conduit for receiving particles from said container, means for producing an air stream within said conduit for entraining the particles within said stream and propelling the same toward a point of discharge, and apparatus for splitting said stream into a plurality of individual, particle-entraining streams containing uniform and randomly divided quantities of said particles, said apparatus comprising:

a horizontally disposed, transversely corrugated pipe of circular cross-section in downstream communication with said conduit for providing a uniform flow of particles through an annular discharge passage of said pipe, said pipe having a longitudinal series of internal, annular, radially inwardly projecting corrugations disposed for random impingement with the particles of said stream as the particles flow through the pipe whereby to randomly distribute the particles throughout the transverse cross-sectional area of the pipe; and a horizontally disposed, tubular, stream-splitting distribution body coupled in downstream communication with said pipe, said body having a transition section progressively and symmetrically changing in a downstream direction from a circular configuration toward a generally flat, rectangular configuration disposed in a horizontal plane, a generally flat transfer section leading from said transition section and spreading symmetrically laterally outwardly in the downstream direction, and a single layer of generally horizontally disposed outlet tubes at the downstream end of said transfer section, said transition section having a circular inlet for receiving particles from said pipe discharge passage, said pipe discharge passage and said inlet being of substantially the same cross sectional area and axially aligned for undisturbed flow of particles from said pipe to said body, said transition section flaring laterally outwardly toward a rectangular downstream end which is substantially wider and substantially shallower than said circular inlet, said transfer section having a horizontal top wall, a horizontal bottom wall, and a pair of spaced apart sidewalls interconnecting said top and said bottom walls and diverging from said downstream end of the transition section.

2. The farm implement as claimed in claim 1, wherein said sidewalls of said transfer section have downstream terminal portions adjacent said layer of outlet tubes, said terminal portions being mutually parallel.

3. The farm implement as claimed in claim 2, wherein said outlet tubes have entry apertures disposed in mutual transverse alignment along a line disposed in perpendicular relationship with the longitudinal axis of the body.

4. The farm implement as claimed in claim 3, wherein said tubes evolve from rectangular configurations of said entry apertures to circular outlets of substantially identical cross-sectional areas as the apertures.

5. The farm implement as claimed in claim 4, wherein alternate ones of said tubes slope upwardly and downardly to facilitate coupling of annular discharge hoses to the tubes.

6. The farm implement as claimed in claim 1, wherein said layer of outlet tubes has a pair of spaced apart, laterally outermost outlet tubes, each of which has an entry aperture of greater cross-sectional area than the cross-sectional area of the entry aperture of each of the other outlet tubes of said layer.

7. The farm implement as claimed in claim 6, wherein the entry apertures of said other outlet tubes have substantially identical cross-sectional areas.

8. The farm implement as claimed in claim 7, wherein the entry apertures of all of said outlet tubes are disposed on an arc having an axis of curvature located upstream from the outlet tubes on the longitudinal axis of the body.

* * * * *